US006546453B1

(12) United States Patent
Kessler et al.

(10) Patent No.: US 6,546,453 B1
(45) Date of Patent: Apr. 8, 2003

(54) PROPRAMMABLE DRAM ADDRESS MAPPING MECHANISM

(75) Inventors: Richard E. Kessler, Shrewsbury, MA (US); Maurice B. Steinman, Marlborough, MA (US); Peter J. Bannon, Concord, MA (US); Michael C. Braganza, Boston, MA (US); Gregg A. Bouchard, Round Rock, TX (US)

(73) Assignee: Compaq Information Technologies Group, L.P., Houston, TX (US)

( * ) Notice: Subject to any disclaimer, the term of this patent is extended or adjusted under 35 U.S.C. 154(b) by 185 days.

(21) Appl. No.: 09/653,093

(22) Filed: Aug. 31, 2000

(51) Int. Cl.$^7$ ................................................ G06F 12/00
(52) U.S. Cl. .......................... 711/5; 711/202; 711/210; 711/105
(58) Field of Search ................................. 711/3, 5, 105, 711/108, 118, 128, 202, 203, 209, 210, 133, 159

(56) References Cited

U.S. PATENT DOCUMENTS

| | | | |
|---|---|---|---|
| 5,261,066 A | 11/1993 | Jouppi et al. ............... | 395/425 |
| 5,317,718 A | 5/1994 | Jouppi ........................ | 395/425 |
| 5,758,183 A | 5/1998 | Scales ......................... | 395/825 |
| 5,761,729 A | 6/1998 | Scales ......................... | 711/148 |
| 5,787,480 A | 7/1998 | Scales et al. ............... | 711/148 |
| 5,802,585 A | 9/1998 | Scales et al. ............... | 711/154 |
| 5,809,450 A | 9/1998 | Chrysos et al. ............ | 702/186 |
| 5,835,963 A * | 11/1998 | Yoshioka et al. ........... | 365/49 |
| 5,875,151 A | 2/1999 | Mick .......................... | 365/233 |
| 5,890,201 A | 3/1999 | McLellan et al. .......... | 711/108 |
| 5,893,165 A * | 4/1999 | Ebrahim ..................... | 710/40 |
| 5,893,931 A | 4/1999 | Peng et al. .................. | 711/206 |
| 5,918,250 A | 6/1999 | Hammond ................... | 711/205 |
| 5,918,251 A | 6/1999 | Yamada et al. ............. | 711/207 |
| 5,923,872 A | 7/1999 | Chrysos et al. ............ | 395/591 |
| 5,950,228 A | 9/1999 | Scales et al. ............... | 711/148 |
| 5,964,867 A | 10/1999 | Anderson et al. ........... | 712/219 |
| 5,983,325 A | 11/1999 | Lewchuk ..................... | 711/137 |
| 6,000,044 A | 12/1999 | Chrysos et al. ............ | 714/47 |
| 6,070,227 A | 5/2000 | Rokicki ....................... | 711/17 |
| 6,085,300 A | 7/2000 | Sunaga et al. .............. | 711/168 |

OTHER PUBLICATIONS

Kanno et al. "A DRAM System for Consistently Reducing CPU Wait Cycles", Symposium on VLIS Circuits Digest of Technical Papers, 1999.*

Zhang et al, A Permutation–based Page Interleaving Scheme to Reduce Row–buffer Conflicts and Exploit Data Locality, IEEE, 2000.*

(List continued on next page.)

Primary Examiner—Matthew Kim
Assistant Examiner—Woo H. Choi
(74) Attorney, Agent, or Firm—Conley Rose, P.C.; Michael F. Beim; Jonathan M. Harris

(57) ABSTRACT

A computer system contains a processor that includes a software programmable memory mapper. The memory mapper maps an address generated by the processor into a device address for accessing physical main memory. The processor also includes a cache controller that maps the processor address into a cache address. The cache address places a block of data from main memory into a memory cache using an index subfield. The physical main memory contains RDRAM devices, each of the RDRAM devices containing a number of memory banks that store rows and columns of data. The memory mapper maps processor addresses to device addresses to increases memory system performance. The mapping minimizes memory access conflicts between the memory banks. Conflicts between memory banks are reduced by placing a number of bits corresponding to the bank subfield above the most significant boundary bit of the index subfield. This diminishes page misses caused by replacement of data blocks from the cache memory because the read of the new data block and write of the victim data block are not to the same memory bank. Adjacent memory bank conflicts are reduced for sequential accesses to memory banks by reversing the bit order of a bank number subfield within the bank subfield of the device address.

7 Claims, 7 Drawing Sheets

OTHER PUBLICATIONS

*Alpha Architecture Reference Manual,* Third Edition, The Alpha Architecture Committee, 1998 Digital Equipment Corporation (21 p.), in particular pp. 3–1 through 3–15.

*A Logic Design Structure For LSI Testability,* E. B. Eichelberger et al., 1977 IEEE (pp. 462–468).

*Direct RDRAM™256/288–Mbit (512K×16/18×32s),* Preliminary Information Document DL0060 Version 1.01 (69 p.).

*Testability Features of AMD–K6™Microprocessor,* R. S. Fetherston et al., Advanced Micro Devices (8 p.).

*Hardware Fault Containment in Scalable Shared–Memory Multiprocessors,* D. Teodosiu et al., Computer Systems Laboratory, Stanford University (12 p.), 1977.

*Cellular Disco: resource management using virtual clusters on shared–memory multiprocessors,* K. Govil et al., 1999 ACM 1–58113–140–2/99/0012 (16 p.).

*Are Your PLDs Metastable?,* Cypress Semiconductor Corporation, Mar. 6, 1997 (19 p.).

*Rambus® RIMM™Module (with 128/144Mb RDRAMs),* Preliminary Information, Document DL0084 Version 1.1 (12 p.).

*Direct Rambus™RIMM™Module Specification Version 1.0,* Rambus Inc., SL–0006–100 (32 p.), 2000.

*End–To–End Fault Containment In Scalable Shared– Memory Multiprocessors,* D. Teodosiu, Jul. 2000 (148 p.).

* cited by examiner

TO FIG.3b

PROPRAMMABLE DRAM ADDRESS MAPPING MECHANISM

CROSS-REFERENCE TO RELATED APPLICATIONS

This application relates to the following commonly assigned co-pending applications entitled:

"Apparatus And Method For Interfacing A High Speed Scan-Path With Slow-Speed Test Equipment," Ser. No. 09/653,642, filed Aug. 31, 2000, "Priority Rules For Reducing Network Message Routing Latency," Ser. No. 09/652,322, filed Aug. 31, 2000, "Scalable Directory Based Cache Coherence Protocol," Ser. No. 09/652,703, filed Aug. 31, 2000, "Scalable Efficient I/O Port Protocol," Ser. No. 09/652,391, filed Aug. 31, 2000, "Efficient Translation Lookaside Buffer Miss Processing In Computer Systems With A Large Range Of Page Sizes," Ser. No. 09/652,552, filed Aug. 31, 2000, "Fault Containment And Error Recovery Techniques In A Scalable Multiprocessor," Ser. No. 09/651,949, filed Aug. 31, 2000, "Speculative Directory Writes In A Directory Based Cache Coherent Nonuniform Memory Access Protocol," Ser. No. 09/652,834, filed Aug. 31, 2000, "Special Encoding Of Known Bad Data," Ser. No. 09/652,314, filed Aug. 31, 2000, "Broadcast Invalidate Scheme," Ser. No. 09/652,165, filed Aug. 31, 2000, "Mechanism To Track All Open Pages In A DRAM Memory System," Ser. No. 09/652,704, filed Aug. 31, 2000, "Computer Architecture And System For Efficient Management Of Bi-Directional Bus," Ser. No. 09/652,323, filed Aug. 31, 2000, "An Efficient Address Interleaving With Simultaneous Multiple Locality Options," Ser. No. 09/652,452, filed Aug. 31, 2000, "A High Performance Way Allocation Strategy For A Multi-Way Associative Cache System," Ser. No. 09/653,092, filed Aug. 31, 2000, "Method And System For Absorbing Defects In High Performance Microprocessor With A Large N-Way Set Associative Cache," Ser. No. 09/651,948, filed Aug. 31, 2000, "A Method For Reducing Directory Writes And Latency In A High Performance, Directory-Based, Coherency Protocol," Ser. No. 09/652,324, filed Aug. 31, 2000, "Mechanism To Reorder Memory Read And Write Transactions For Reduced Latency And Increased Bandwidth," Ser. No. 09/653,094, filed Aug. 31, 2000, "System For Minimizing Memory Bank Conflicts In A Computer System," Ser. No. 09/652,325, filed Aug. 31, 2000, "Computer Resource Management And Allocation System," Ser. No. 09/651,945, filed Aug. 31, 2000, "Input Data Recovery Scheme," Ser. No. 09/653,643, filed Aug. 31, 2000, "Fast Lane Prefetching," Ser. No. 09/652,451, filed Aug. 31, 2000, "Mechanism For Synchronizing Multiple Skewed Source-Synchronous Data Channels With Automatic Initialization Feature," Ser. No. 09/652,480, filed Aug. 31, 2000, "Mechanism To Control The Allocation Of An N-Source Shared Buffer," Ser. No. 09/651,924, filed Aug. 31, 2000, and "Chaining Directory Reads And Writes To Reduce DRAM Bandwidth In A Directory Based CC-NUMA Protocol," Ser. No. 09/652,315, filed Aug. 31, 2000, all of which are incorporated by reference herein.

STATEMENT REGARDING FEDERALLY SPONSORED RESEARCH OR DEVELOPMENT

Not applicable.

BACKGROUND OF THE INVENTION

1. Field of the Invention

The present invention generally relates to a computer system that includes one or more random access memory ("RAM") devices for storing data. More particularly, the invention relates to a computer system with RAM devices in which multiple banks of storage can be accessed simultaneously to enhance the performance of the memory devices. Still more particularly, the present invention relates to a system for the mapping of processor addresses to memory device addresses that effectively minimizes simultaneous accesses to the same bank of memory to avoid access delays.

2. Background of the Invention

Superscalar processors achieve high performance by executing multiple instructions per clock cycle and by choosing the shortest possible clock cycle consistent with the design. On the other hand, superpipelined processor designs divide instruction execution into a large number of subtasks which can be performed quickly, and assign pipeline stages to each subtask. By overlapping the execution of many instructions within the pipeline, superpipelined processors attempt to achieve high performance.

Superscalar processors demand low main memory latency due to the number of instructions attempting concurrent execution and due to the increasing clock frequency (i.e., shortened clock cycle) employed by the processors. Many of the instructions include memory operations to fetch ("read") and update ("write") memory operands. The memory operands must be fetched from or conveyed to main memory, and each instruction must originally be fetched from main memory as well. Similarly, processors that are superpipelined demand low main memory latency because of the high clock frequency employed by these processors and the attempt to begin execution of a new instruction each clock cycle. It is noted that a given processor design may employ both superscalar and superpipelined techniques in an attempt to achieve the highest possible performance characteristics.

Processors are often configured into computer systems that have a relatively large and slow main memory. Typically, multiple random access memory ("RAM") modules comprise the main memory system. The RAM modules may be Single Inline Memory Modules ("SIMM"), Double Inline Memory Modules ("DIMM"), or RAMbus™ Inline Memory Modules ("RIMM") that incorporate a number of Random Access Memory ("RAM") devices (see "RAMBUS Preliminary Information Direct RDRAM™", Document DL0060 Version 1.01; "Direct Rambus™ RIMM™ Module Specification Version 1.0", Document SL-0006-100; "Rambus® RIMM™ Module (with 128/144 Mb RDRAMs)" Document DL00084 Version 1.1, all of which are incorporated by reference herein). RAM devices may be Dynamic Random Access Memory ("DRAM") devices, RAMbus™ DRAM ("RDRAM") or any of a number of other types of memory storage devices. Each RAM device consists of a DRAM core section containing memory banks organized into rows and columns, with each column containing a number of bytes (in the preferred embodiment 16 bytes). A large main memory provides storage for a large number of instructions and/or a large amount of data for use by the processor, providing faster access to the instructions and/or data than may be achieved for example from disk storage. However, the access times of modem RAMs are significantly longer than the clock cycle length of modem processors. The memory access time for each set of bytes being transferred to the processor is therefore long. Accordingly, the main memory system is not a low latency system. Processor performance may suffer due to high memory latency.

Many types of RAMs employ a "page mode" which allows for memory latency to be decreased for transfers within the same "page". Generally, as explained above, RAMs comprise memory arranged into rows and columns of storage. A first portion of the address identifying the desired data/instructions is used to select one of the rows (the "row address"), and a second portion of the address is used to select one of the columns (the "column address"). One or more bytes residing at the selected row and columns are provided as output of the RAM. Typically, the row address is provided to the RAM first, and the selected row is placed into a temporary sense amplifier buffer within the RAM. The row of data that is stored in the RAM's sense amplifier is referred to as a page. Thus, addresses having the same row address are said to be in the same page. Subsequent to the selected row being placed into the sense amplifier buffer, the column address is provided and the selected data is output from the RAM. A row/page hit occurs if the next address to access the RAM is within the same row/page stored in the sense amplifier buffer. Thus, the next access may be performed by providing the column portion of the address only, omitting the row address transmission. The next access to a different column may therefore be performed with lower latency, saving the time required for transmitting the row address because the page corresponding to the row has already been activated. The size of a row/page is dependent upon the number of columns within the row/page. The row/page stored in the sense amplifier within the RAM is referred to as an "open page", since accesses within the open page can be performed by transmitting the column portion of the address only.

Unfortunately, the first access to a given row/page generally does not occur to an open row/page, thereby incurring a higher memory latency. Even further, the first access may experience a row/page miss. A row/page miss can occur if the sense amplifier has another particular row/page open, and the particular row/page must first be closed before opening the row/page containing the current access. A row/page miss can also occur if the sense amplifier is empty. Often, this first access is critical to maintaining performance in the processor within the computer system, as the data/instructions are immediately needed to satisfy a miss. Instruction execution may stall because of the row/page miss while the row/page containing the current access is being opened. The more often that instructions can access main memory using row/page hits, the lower the latency of memory access and the better the system performance. In a memory system containing many RAM devices and thus a large number of sense amplifier buffers, a large amount of memory can be accessed using row/page hits, resulting in an increased opportunity to maximize performance.

Software applications executing on the computer system frequently perform read or write operations that include a processor memory address mapped to a device address. The device address identifies a DRAM device, memory banks within the DRAM device, and rows and columns within each memory bank. The mapping of the processor memory address to the device address selects the DRAM device and row and column and manages memory bank conflicts. Memory bank conflicts are caused by attempts to perform a read or write to a memory bank within a DRAM device while another read or write is occurring to the same memory bank. Memory bank conflicts degrade memory system performance because memory transactions must be delayed while a previous memory transaction completes within the DRAM device. Thus, to increase system performance the mapping strategy implemented must reduce memory bank conflicts. Because memory configurations can vary widely in the number of DRAM devices present as well as the organization of the DRAM devices (i.e., number of memory banks, interface logic operation), it is highly desirable to permit a system programmer to program the mapping scheme for each particular configuration and software application to allow maximum system performance.

The mapping of processor memory addresses to device addresses for optimal performance must take into account read and write traffic patterns on main memory. One property of read/write memory traffic is referred to as locality of reference. Locality of reference means that if a memory address "A" is accessed, then it is likely that the next address "B" is near or adjacent to "A." An address-mapping scheme should not result in memory bank conflicts from successive accesses to contiguous addresses in main memory. For example, assume that a software application is performing reads and writes to a large contiguous area of main memory that spans row/page boundaries. As long as memory is being accessed from the same row/page in the sense amplifier, no row/page misses occur and thus the page in the sense amplifier does not have to be replaced with a different row/page. However, when the end of the row/page in the sense amplifier is reached and the next row/page is required, a row/page close cycle is needed to store the old row/page and a row/page open cycle is required to open the new row/page. If the processor memory address to device address mapping scheme is such that the next required row containing the new page is in the same memory bank or an adjacent memory bank (for DRAM devices in which memory banks share sense amplifiers) as the row containing the previous page, opening the next row/page to perform reads and writes will be delayed while the closure of the previous row/page completes. It would be advantageous if successive reads and writes to contiguous rows/pages of memory resulted in accesses to different nonadjacent memory banks of the DRAM device.

Another common read/write traffic pattern occurs in processors that include cache memories. Processors use cache memory in memory systems to improve computer system performance. A cache memory holds a subset of the contents of main memory and is faster and smaller than main memory. An architecture common in the art provides a level one ("L1") cache on the same integrated circuit as the microprocessor and a level two ("L2") cache either on the same integrated circuit as the microprocessor or on the system board of the computer. The smallest unit of memory that can be loaded into a cache memory is known as a cache block. A set associative cache is divided up into sets with each set containing two or more block frames that store blocks of data from main memory. A block of data from main memory is first mapped into a set of the cache and then it can be placed anywhere within the set. The cache placement is called n-way set associative if there are n block frames in a set.

Read/write memory transactions in the computer system may result in the cache memory becoming full. A read or write request to a memory block not present in the cache would then result in the replacement of a existing memory block present in a set of the cache memory. If the cache memory is a writeback set associative cache, the new read or write requests can result in the replacement of modified data in a cache block that must be written back to main memory. Each processor address in a block of data from main memory is mapped to a cache address that includes an index subfield identifying the particular set in the cache that the data block would be placed into. Thus, the addresses of blocks of data in the block frames of a particular set in the cache have the same index subfield and other blocks of data in main memory may also have the same index subfield. A processor address to device address mapping scheme should advantageously seek to prevent memory bank conflicts from occurring by mapping the portion of the address that is not equal (i.e., fields other than index subfield) in such a manner so that the mapped memory banks selected are different. Despite the apparent performance advantages of such a mapping scheme, to date no such system allowing flexibility to maximize performance over all memory hardware configurations has been implemented.

BRIEF SUMMARY OF THE INVENTION

The problems noted above are solved in large part by the systems and techniques of the preferred embodiment of the present invention, which avoids delays resulting from memory bank conflicts. Preferably, a computer system contains a processor that includes a software programmable memory mapper. The memory mapper maps an address generated by the processor into a device address for accessing physical main memory. The processor also includes a cache controller that maps the processor address into a cache address. The cache address places a block of data from main memory into a memory cache using an index subfield. The physical main memory contains RDRAM devices, each of the RDRAM devices containing a number of memory banks that store rows and columns of data. The memory mapper maps processor addresses to device addresses to increases memory system performance. The mapping minimizes memory access conflicts between the memory banks.

Conflicts between memory banks are reduced by placing a number of bits corresponding to the bank subfield above the most significant boundary bit of the index subfield. This diminishes the likelihood of page misses resulting from the replacement of data blocks in the cache memory because the read of the new data block and write of the victim data block are not to the same memory bank.

Adjacent memory bank conflicts are reduced for sequential accesses to memory banks by reversing the bit order of a bank number subfield within the bank subfield of the device address.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION OF THE PREFERRED EMBODIMENTS

Figure 1:
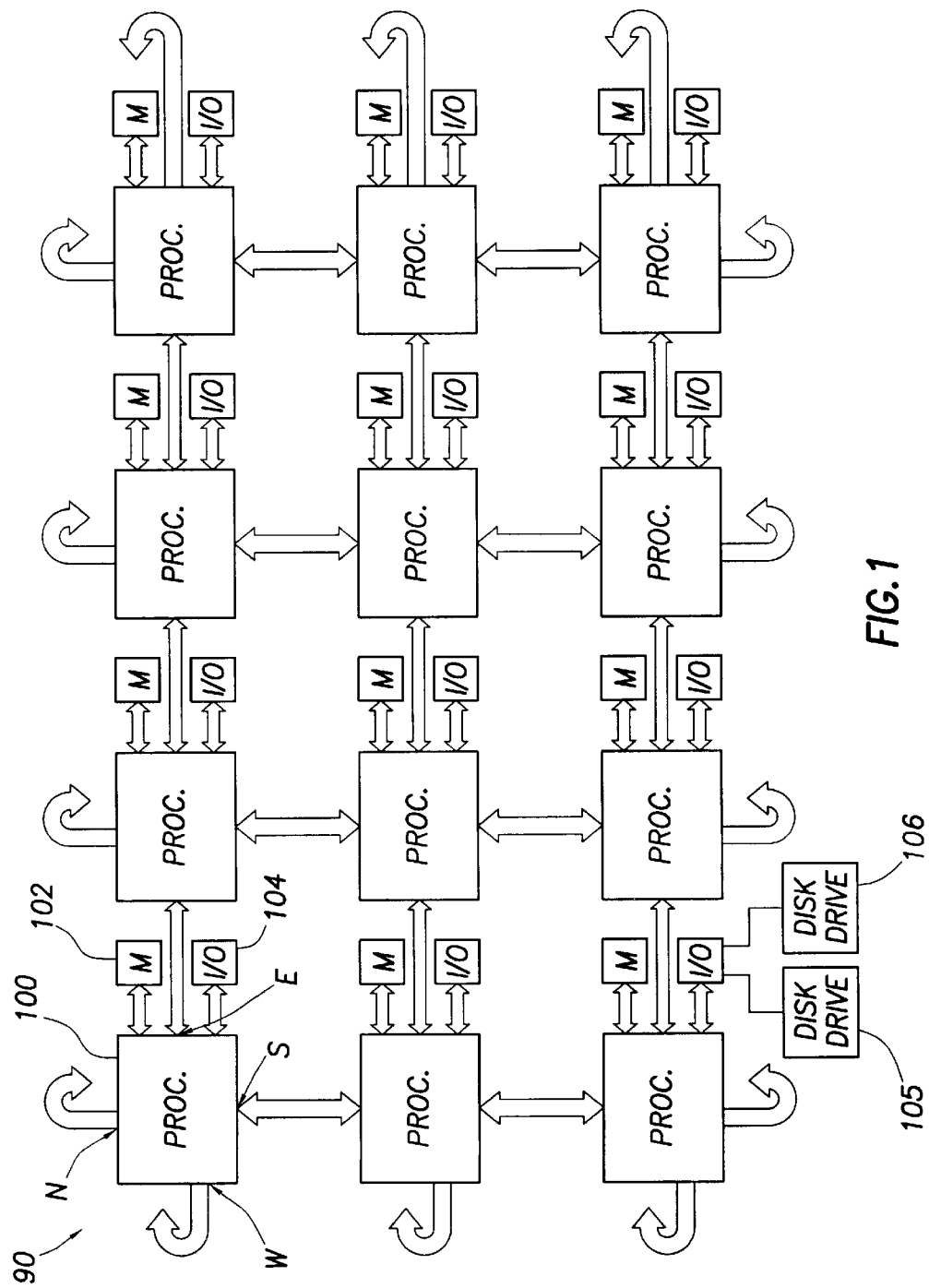
FIG. 1 shows a system diagram of a plurality of microprocessors coupled together.

Referring now to FIG. 1, in accordance with the preferred embodiment of the invention, computer system 90 constructed in accordance with the preferred embodiment comprises one or more processors 100 coupled to a memory 102 and an input/output ("I/O") controller 104. As shown in FIG. 1, computer system 90 includes twelve processors 100, each processor coupled to a memory and an I/O controller. Although the computer system 90 is shown as a multiple processor system in FIG. 1, it should be understood that the present invention also may be implemented on a single processor system, and thus the following disclosure is intended to be illustrative of the preferred embodiment of practicing the invention, and is not intended to imply that the invention is limited to use in a multi-processor system.

According to the preferred embodiment, each processor preferably includes four ports for connection to adjacent processors. The inter-processor ports are designated "north," "south," "east," and "west" in accordance with the well-known Manhattan grid architecture. As such, each processor 100 can be connected to four other processors. The processors on both end of the system layout wrap around and connect to processors on the opposite side to implement a 2D torus-type connection. Although twelve processors 100 are shown in the exemplary embodiment of FIG. 1, any desired number of processors (e.g., 256) can be included. In the preferred embodiment, computer system 90 is designed to accommodate either 256 processors or 128 processors, depending on the size of the memory associated with the processors.

The I/O controller 104 provides an interface to various input/output devices such as disk drives 105 and 106 as shown. Data from the I/O devices thus enters the 2D torus via the I/O controllers.

In accordance with the preferred embodiment, the memory 102 preferably comprises RAMbus™ memory devices, but other types of memory devices can be used if desired. The capacity of the memory devices 102 can be any suitable size. Furthermore, memory devices 102 preferably are coupled to the microprocessor through Rambus Interface Memory Modules ("RIMMs").

In general, computer system 90 can be configured so that any microprocessor 100 can access its own memory 102 and I/O devices, as well as the memory and I/O devices of all other microprocessors in the network. Preferably, the computer system may have dedicated physical connections between each microprocessor resulting in low interprocessor communication times and improved memory and I/O device access reliability. If dedicated physical connections are not present between each pair of microprocessors, a pass-through or bypass path is preferably implemented in each microprocessor that permits accesses to a microprocessor's memory and I/O devices by another microprocessor through one or more pass-through microprocessors.

Figure 2A:
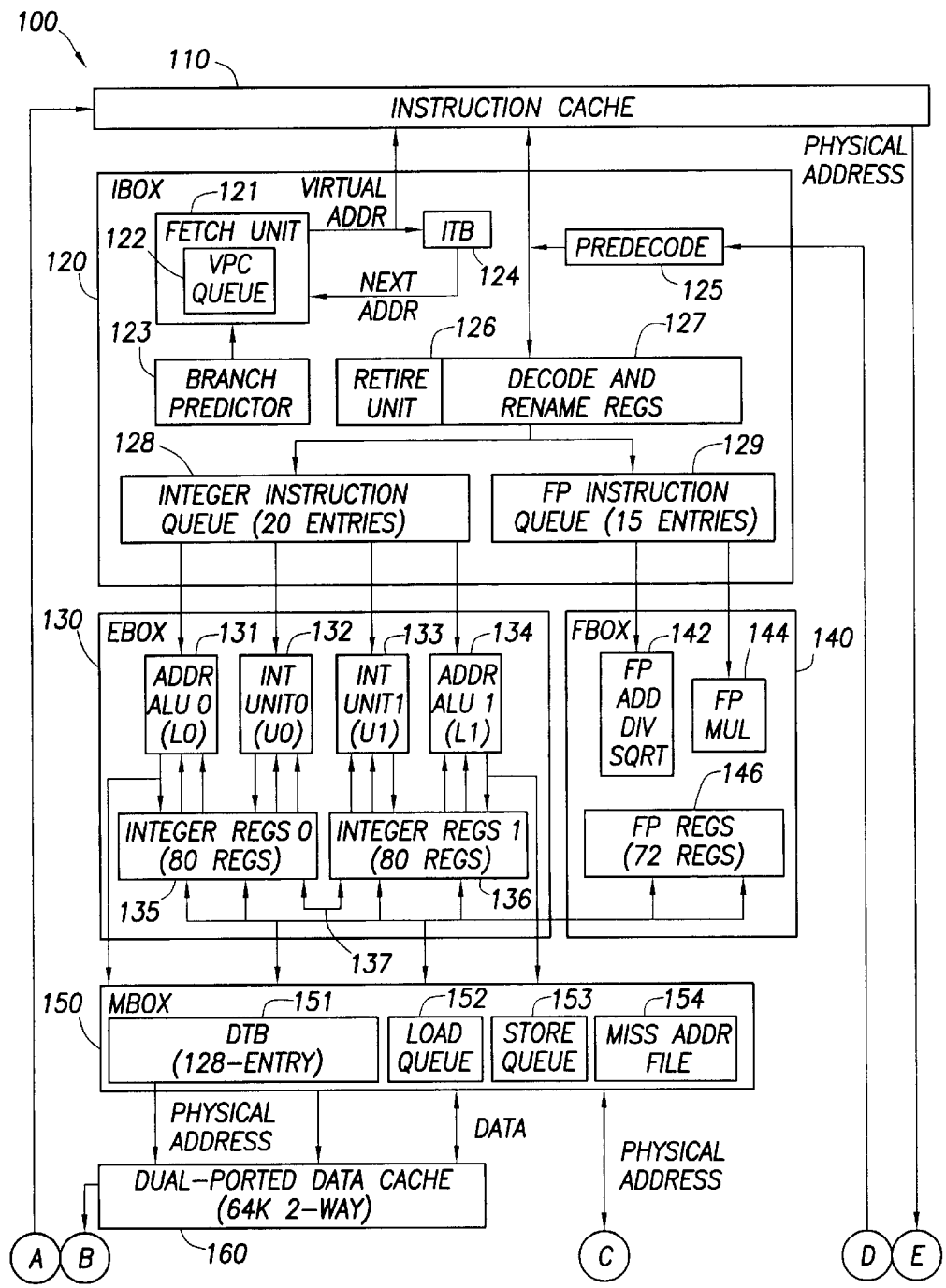
FIGS. 2a and 2b show a block diagram of the microprocessors of FIG. 1.
Figure 2B:
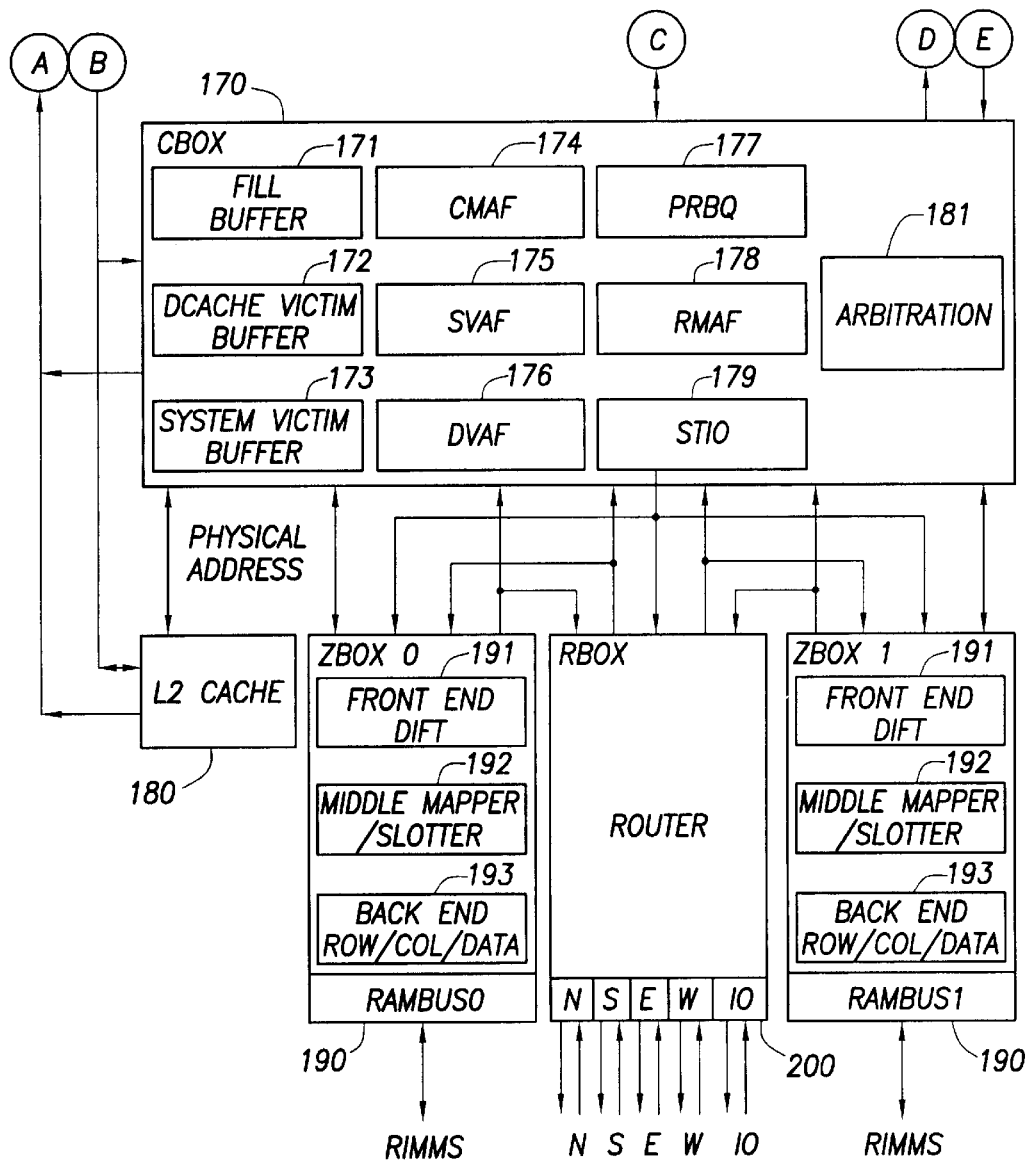

Referring now to FIGS. 2a and 2b, each microprocessor 100 preferably includes an instruction cache 110, an instruction fetch, issue and retire unit ("Ibox") 120, an integer execution unit ("Ebox") 130, a floating-point execution unit ("Fbox") 140, a memory reference unit ("Mbox") 150, a data cache 160, an L2 instruction and data cache control unit ("Cbox") 170, a level L2 cache 180, two memory controllers ("Zbox0" and "Zbox1") 190, and an interprocessor and I/O router unit ("Rbox") 200. The following discussion describes each of these units.

Each of the various functional units 110–200 contains control logic that communicate with various other control logic as shown in FIGS. 2a and 2b. The instruction cache control logic 110 communicates with the Ibox 120, Cbox 170, and L2 Cache 180. In addition to communicating with the instruction cache 110, the Ibox control logic 120 communicates with Ebox 130, Fbox 140 and Cbox 170. The Ebox 130 and Fbox 140 control logic both communicate with the Mbox 150, which in turn communicates with the data cache 160 and Cbox 170. The Cbox control logic also communicates with the L2 cache 180, Zboxes 190, and Rbox 200.

Referring still to FIGS. 2a and 2b, the Ibox 120 preferably includes a fetch unit 121 which contains a virtual program counter ("VPC") 122, a branch predictor 123, an instruction-stream translation buffer ("ITB") 124, an instruction predecoder 125, a retire unit 126, decode and rename registers 127, an integer instruction queue 128, and a floating point instruction queue 129. Generally, the VPC 122 maintains virtual addresses for instructions that are in flight. An instruction is said to be "in-flight" from the time it is fetched until it retires or aborts. The Ibox 120 can accommodate as many as 80 instructions, in 20 successive fetch slots, in flight between the decode and rename registers 127 and the end of the pipeline. The VPC preferably includes a 20-entry table to store these fetched VPC addresses.

The Ibox 120 uses the branch predictor 123 to handle branch instructions. A branch instruction requires program execution either to continue with the instruction immediately following the branch instruction if a certain condition is met, or branch to a different instruction if the particular condition is not met. Accordingly, the outcome of a branch instruction is not known until the instruction is executed. In a pipelined architecture, a branch instruction (or any instruction for that matter) may not be executed for at least several, and perhaps many, clock cycles after the fetch unit in the microprocessor fetches the branch instruction. In order to keep the pipeline full, which is desirable for efficient operation, the microprocessor preferably includes branch prediction logic that predicts the outcome of a branch instruction before it is actually executed (also referred to as "speculating"). The branch predictor 123, which receives addresses from the VPC queue 122, preferably bases its speculation on short and long-term history of prior instruction branches. As such, using branch prediction logic, a microprocessor's fetch unit can speculate the outcome of a branch instruction before it is actually executed. The speculation, however, may or may not turn out to be accurate. That is, the branch predictor logic may guess wrong regarding the direction of program execution following a branch instruction. If the speculation proves to have been accurate, which is determined when the microprocessor executes the branch instruction, then the next instructions to be executed have already been fetched and are working their way through the pipeline.

If, however, the branch speculation performed by the branch predictor 123 turns out to have been wrong (referred to as "misprediction" or "misspeculation"), many or all of the instructions behind the branch instruction may have to be flushed from the pipeline (i.e., not executed) because of the incorrect fork taken after the branch instruction. Branch predictor 123 uses any suitable branch prediction algorithm, however, that results in correct speculations more often than misspeculations, and the overall performance of the microprocessor is better (even in the face of some misspeculations) than if speculation was turned off.

The Instruction Translation Buffer ("ITB") 124 couples to the instruction cache 110 and the fetch unit 121. The ITB 124 comprises a 128-entry, fully-associative instruction-stream translation buffer that is used to store recently used instruction-stream address translations and page protection information. Preferably, each of the entries in the ITB 124 may be 1, 8, 64 or 512 contiguous 8-kilobyte ("KB") pages or 1, 32, 512, 8192 contiguous 64-kilobyte pages. The allocation scheme used for the ITB 124 is a round-robin scheme, although other schemes can be used as desired.

The predecoder 125 reads an octaword (16 contiguous bytes) from the instruction cache 110. Each octaword read from instruction cache may contain up to four naturally aligned instructions per cycle. Branch prediction and line prediction bits accompany the four instructions fetched by the predecoder 125. The branch prediction scheme implemented in branch predictor 123 generally works most efficiently when only one branch instruction is contained among the four fetched instructions. The predecoder 125 predicts the instruction cache line that the branch predictor 123 will generate. The predecoder 125 generates fetch requests for additional instruction cache lines and stores the instruction stream data in the instruction cache.

Referring still to FIGS. 2a and 2b, the retire unit 126 fetches instructions in program order, executes them out of order, and then retires (also called "committing" an instruction) them in order. The Ibox 120 logic maintains the architectural state of the microprocessor by retiring an instruction only if all previous instructions have executed without generating exceptions or branch mispredictions. An exception is any event that causes suspension of normal instruction execution. Retiring an instruction commits the microprocessor to any changes that the instruction may have made to the software accessible registers and memory. The microprocessor 100 preferably includes the following three machine code accessible hardware units: integer and floating-point registers, memory, and internal microprocessor registers. The retire unit 126 of the preferred embodiment can retire instructions at a sustained rate of eight instructions per cycle, and can retire as many as 11 instructions in a single cycle.

The decode and rename registers 127 contains logic that forwards instructions to the integer and floating-point instruction queues 128, 129. The decode and rename registers 127 preferably the following two functions. First, the decode and rename registers 127 eliminates register write-after-read ("WAR") and write-after-write ("WAW") data dependency while preserving true read-after-write ("RAW") data dependencies. This permits instructions to be dynamically rescheduled. Second, the decode and rename registers 127 permits the microprocessor to speculatively execute instructions before the control flow previous to those instructions is resolved.

The logic in the decode and rename registers 127 preferably translates each instruction's operand register specifiers from the virtual register numbers in the instruction to the physical register numbers that hold the corresponding architecturally-correct values. The logic also renames each instruction destination register specifier from the virtual number in the instruction to a physical register number chosen from a list of free physical registers, and updates the register maps. The decode and rename register logic can process four instructions per cycle. Preferably, the logic in the decode and rename registers 127 does not return the physical register, which holds the old value of an instruction's virtual destination register, to the free list until the instruction has been retired, indicating that the control flow up to that instruction has been resolved.

If a branch misprediction or exception occurs, the register logic backs up the contents of the integer and floating-point rename registers to the state associated with the instruction that triggered the condition, and the fetch unit 121 restarts at the appropriate Virtual Program Counter ("VPC"). Preferably, as noted above, 20 valid fetch slots containing up to 80 instructions can be in flight between the registers 127 and the end of the microprocessor's pipeline, where control flow is finally resolved. The register 127 logic is capable of backing up the contents of the registers to the state associated with any of these 80 instructions in a single cycle. The register logic 127 preferably places instructions into the integer or floating-point issue queues 128, 129, from which they are later issued to functional units 130 or 136 for execution.

The integer instruction queue 128 preferably includes capacity for 20 integer instructions. The integer instruction queue 128 issues instructions at a maximum rate of four instructions per cycle. The specific types of instructions processed through queue 128 include: integer operate commands, integer conditional branches, unconditional branches (both displacement and memory formats), integer and floating-point load and store commands, Privileged Architecture Library ("PAL") reserved instructions, integer-to-floating-point and floating-point-integer conversion commands.

Referring still to FIGS. 2a and 2b, the integer execution unit ("Ebox") 130 includes Arithmetic Logic Units ("ALUs") 131, 132, 133, and 134 and two integer register files 135. Ebox 130 preferably comprises a 4-path integer execution unit that is implemented as two functional-unit "clusters" labeled 0 and 1. Each cluster contains a copy of an 80-entry, physical-register file and two subclusters, named upper ("U") and lower ("L"). As such, the subclusters 131–134 are labeled U0, L0, U1, and L1. Bus 137 provides cross-cluster communication for moving integer result values between the clusters.

The subclusters 131–134 include various components that are not specifically shown in FIG. 2a. For example, the subclusters preferably include four 64-bit adders that are used to calculate results for integer add instructions, logic units, barrel shifters and associated byte logic, conditional branch logic, a pipelined multiplier for integer multiply operations, and other components known to those of ordinary skill in the art.

Each entry in the integer instruction queue 128 preferably asserts four request signals—one for each of the Ebox 130 subclusters 131, 132, 133, and 134. A queue entry asserts a request when it contains an instruction that can be executed by the subcluster, if the instruction's operand register values are available within the subcluster. The integer instruction queue 128 includes two arbiters—one for the upper subclusters 132 and 133 and another arbiter for the lower subclusters 131 and 134. Each arbiter selects two of the possible 20 requesters for service each cycle. Preferably, the integer instruction queue 128 arbiters choose between simultaneous requesters of a subcluster based on the age of the request older requests are given priority over newer requests. If a given instruction requests both lower subclusters, and no older instruction requests a lower subcluster, then the arbiter preferably assigns subcluster 131 to the instruction. If a given instruction requests both upper subclusters, and no older instruction requests an upper subcluster, then the arbiter preferably assigns subcluster 133 to the instruction.

The floating-point instruction queue 129 preferably comprises a 15-entry queue and issues the following types of instructions: floating-point operates, floating-point conditional branches, floating-point stores, and floating-point register to integer register transfers. Each queue entry preferably includes three request lines-one for the add pipeline, one for the multiply pipeline, and one for the two store pipelines. The floating-point instruction queue 129 includes three arbiters—one for each of the add, multiply, and store pipelines. The add and multiply arbiters select one requester per cycle, while the store pipeline arbiter selects two requesters per cycle, one for each store pipeline. As with the integer instruction queue 128 arbiters, the floating-point instruction queue arbiters select between simultaneous requesters of a pipeline based on the age of the request—older request are given priority. Preferably, floating-point store instructions and floating-point register to integer register transfer instructions in even numbered queue entries arbitrate for one store port. Floating-point store instructions and floating-point register to integer register transfer instructions in odd numbered queue entries arbitrate for the second store port.

Floating-point store instructions and floating-point register to integer register transfer instructions are queued in both the integer and floating-point queues. These instructions wait in the floating-point queue until their operand register values are available from the floating-point execution unit ("Fbox") registers. The instructions subsequently request service from the store arbiter. Upon being issued from the floating-point queue 129, the instructions signal the corresponding entry in the integer queue 128 to request service. Finally, upon being issued from the integer queue 128, the operation is completed.

The integer registers 135, 136 preferably contain storage for the microprocessor's integer registers, results written by instructions that have not yet been retired, and other information as desired. The two register files 135, 136 preferably contain identical values. Each register file preferably includes four read ports and six write ports. The four read ports are used to source operands to each of the two subclusters within a cluster. The six write ports are used to write results generated within the cluster or another cluster and to write results from load instructions.

The floating-point execution queue ("Fbox") 129 contains a floating-point add, divide and square-root calculation unit 142, a floating-point multiply unit 144 and a register file 146. Floating-point add, divide and square root operations are handled by the floating-point add, divide and square root calculation unit 142 while floating-point operations are handled by the multiply unit 144.

The register file 146 preferably provides storage for 72 entries including 31 floating-point registers and 41 values written by instructions that have not yet been retired. The Fbox register file 146 contains six read ports and four write ports (not specifically shown). Four read ports are used to source operands to the add and multiply pipelines, and two read ports are used to source data for store instructions. Two write ports are used to write results generated by the add and multiply pipelines, and two write ports are used to write results from floating-point load instructions. still to FIG. 2a, the Mbox 150 controls the L1 data cache 160 and ensures architecturally correct behavior for load and store instructions. The Mbox 150 preferably contains a datastream translation buffer ("DTB") 151, a load queue ("LQ") 152, a store queue ("SQ") 153, and a miss address file ("MAF") 154. The DTB 151 preferably comprises a fully associative translation buffer that is used to store data stream address translations and page protection information. Each of the entries in the DTB 151 can map 1, 8, 64, or 512 contiguous 8-KB pages. The allocation scheme preferably is round robin, although other suitable schemes could also be used. The DTB 151 also supports an 8-bit Address Space Number ("ASN") and contains an Address Space Match ("ASM") bit. The ASN is an optionally implemented register used to reduce the need for invalidation of cached address translations for process-specific addresses when a context switch occurs.

The LQ 152 preferably is a reorder buffer used for load instructions. It contains 32 entries and maintains the state associated with load instructions that have been issued to the Mbox 150, but for which results have not been delivered to the microprocessor and the instructions retired. The Mbox 150 assigns load instructions to LQ slots based on the order in which they were fetched from the instruction cache 110, and then places them into the LQ 152 after they are issued by the integer instruction queue 128. The LQ 152 also helps to ensure correct memory reference behavior for the microprocessor.

The SQ 153 preferably is a reorder buffer and graduation unit for store instructions. It contains 32 entries and maintains the state associated with store instructions that have been issued to the Mbox 150, but for which data has not been written to the data cache 160 and the instruction retired. The Mbox 150 assigns store instructions to SQ slots based on the order in which they were fetched from the instruction cache 10 and places them into the SQ 153 after they are issued by the instruction cache 110. The SQ 153 holds data associated with the store instructions issued from the integer instruction unit 128 until they are retired, at which point the store can be allowed to update the data cache 160. The LQ 152 also helps to ensure correct memory reference behavior for the microprocessor.

The MAF 154 preferably comprises a 16-entry file that holds physical addresses associated with pending instruction cache 110 and data cache 160 fill requests and pending input/output ("I/O") space read transactions.

Microprocessor 100 preferably includes two on-chip primary-level ("L1") instruction and data caches 110 and 160, and single secondary-level, unified instruction/data ("L2") cache 180 (FIG. 2b). The L1 instruction cache 110 preferably is a 64-KB virtual-addressed, two-way set-associative cache. Prediction is used to improve the performance of the two-way set-associative cache without slowing the cache access time. Each instruction cache block preferably contains a plurality (preferably 16) instructions, virtual tag bits, an address space number, an address space match bit, a one-bit PALcode bit to indicate physical addressing, a valid bit, data and tag parity bits, four access-check bits, and predecoded information to assist with instruction processing and fetch control.

The L1 data cache 160 preferably is a 64-KB, two-way set associative, virtually indexed, physically tagged, write-back, read/write allocate cache with 64-byte cache blocks. During each cycle the data cache 160 preferably performs one of the following transactions: two quadword (or shorter) read transactions to arbitrary addresses, two quadword write transactions to the same aligned octaword, two non-overlapping less-than quadword writes to the same aligned quadword, one sequential read and write transaction from and to the same aligned octaword. Preferably, each data cache block contains 64 data bytes and associated quadword ECC bits, physical tag bits, valid, dirty shared, and modified bits, tag parity bit calculated across the tag, dirty, shared, and modified bits, and one bit to control round-robin set allocation. The data cache 160 is organized to contain two sets, each with 512 rows containing 64-byte blocks per row (i.e., 32-KB of data per set). The microprocessor 100 uses two additional bits of virtual address beyond the bits that specify an 8-KB page in order to specify the data cache row index. A given virtual address might be found in four unique locations in the data cache 160, depending on the virtual-to-physical translation for those two bits. The microprocessor 100 prevents this aliasing by keeping only one of the four possible translated addresses in the cache at any time.

The L2 cache 180 preferably is a 1.75-MB, seven-way set associative write-back mixed instruction and data cache. Preferably, the L2 cache holds physical address data and coherence state bits for each block.

Referring now to FIG. 2b, the L2 instruction and data cache control unit ("Cbox") 170 controls the L2 instruction and data cache 190 and system ports. As shown, the Cbox 170 contains a fill buffer 171, a data cache victim buffer 172, a system victim buffer 173, a cache miss address file ("CMAF") 174, a system victim address file ("SVAF") 175, a data victim address file ("DVAF") 176, a probe queue ("PRBQ") 177, a requester miss-address file ("RMAF") 178, a store to I/O space ("STIO") 179, and an arbitration unit 181.

The fill buffer 171 preferably in the Cbox is used to buffer data that comes from other functional units outside the Cbox. The data and instructions get written into the fill buffer and other logic units in the Cbox process the data and instructions before sending to another functional unit or the L1 cache. The data cache victim buffer ("VDF") 172 preferably stores data flushed from the L1 cache or sent to the System Victim Data Buffer 173. The System Victim Data Buffer ("SVDB") 173 is used to send data flushed from the L2 cache to other microprocessors in the system and to memory. Cbox Miss-Address File ("CMAF") 174 preferably holds addresses of L1 cache misses. CMAF updates and maintains the status of these addresses. The System Victim-Address File ("SVAF") 175 in the Cbox preferably contains the addresses of all SVDB data entries. Data Victim-Address File ("DVAF") 176 preferably contains the addresses of all data cache victim buffer ("VDF") data entries.

The Probe Queue ("PRBQ") 177 preferably comprises a 18-entry queue that holds pending system port cache probe commands and addresses. This queue includes 10 remote request entries, 8 forward entries, and lookup L2 tags and requests from the PRBQ content addressable memory ("CAM") against the RMAF, MAF, and SVAF. Requestor Miss-Address Files ("RMAF") 178 in the Cbox preferably accepts requests and responds with data or instructions from the L2 cache. Data accesses from other functional units in the microprocessor, other microprocessors in the computer system or any other devices that might need data out of the L2 cache are sent to the RMAF for service. The Store Input/Output ("STIO") 179 preferably transfer data from the local microprocessor to I/O cards in the computer system. Finally, arbitration unit 181 in the Cbox preferably arbitrates between load and store accesses to the same memory location of the L2 cache and informs other logic blocks in the Cbox and computer system functional units of the conflict.

Referring still to FIG. 2b, microprocessor 100 preferably includes dual, integrated Rambus memory controllers 190 (Zbox0 and Zbox1). Each Zbox 190 controls 4 or 5 channels of information flow with the main memory 102 (FIG. 1). Each Zbox preferably includes a front-end directory in-flight table ("DIFT") 191, a middle mapper 192, and a back end 193. The front-end DIFT 191 performs a number of functions such as managing the microprocessor's directory-based memory coherency protocol, processing request commands from the Cbox 170 and Rbox 200, sending forward commands to the Rbox, sending response commands to and receiving packets from the Cbox and Rbox, and tracking up to 32 in-flight transactions. The front-end DIFT 191 also sends directory read and write requests to the Zbox and conditionally updates directory information based on request type, Local Probe Response ("LPR") status and directory state.

The middle mapper 192 maps the physical address into Rambus device format by device, bank, row, and column. The middle mapper 192 also maintains an open-page table to track all open pages and to close pages on demand if bank conflicts arise. The mapper 192 also schedules Rambus transactions such as timer-base request queues. The Zbox back end 193 preferably packetizes the address, control, and data into Rambus format and provides the electrical interface to the Rambus devices themselves.

The Rbox 200 provides the interfaces to as many as four other microprocessors and one I/O controller 104 (FIG. 1). The inter-processor interfaces are designated as North ("N"), South ("S"), East ("E"), and West ("W") and provide two-way communication between adjacent microprocessors.

Figure 3A:
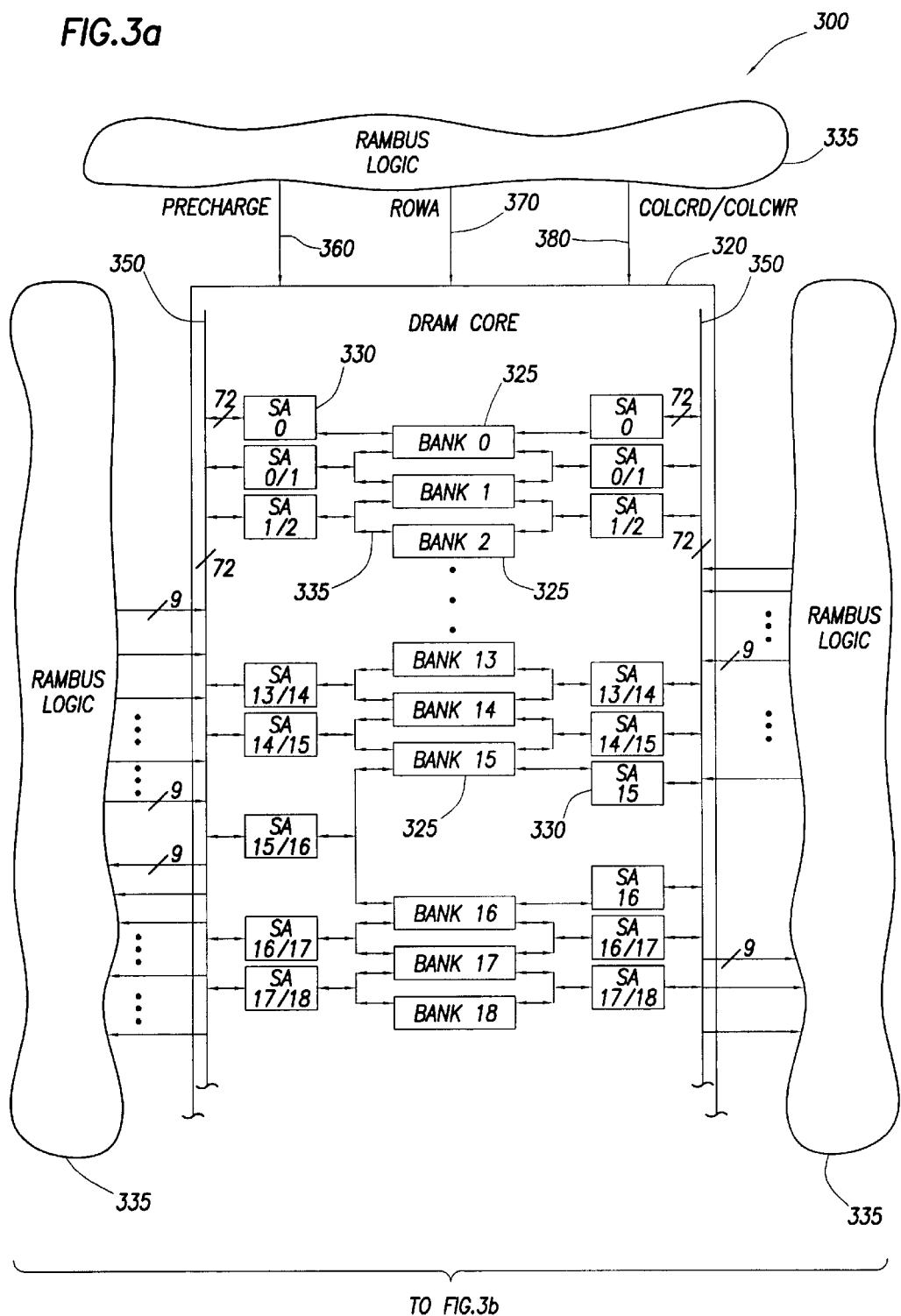
FIG. 3 is a diagram showing a RAMbus™ Dynamic Random Access Memory device of the preferred embodiment.
Figure 3B:
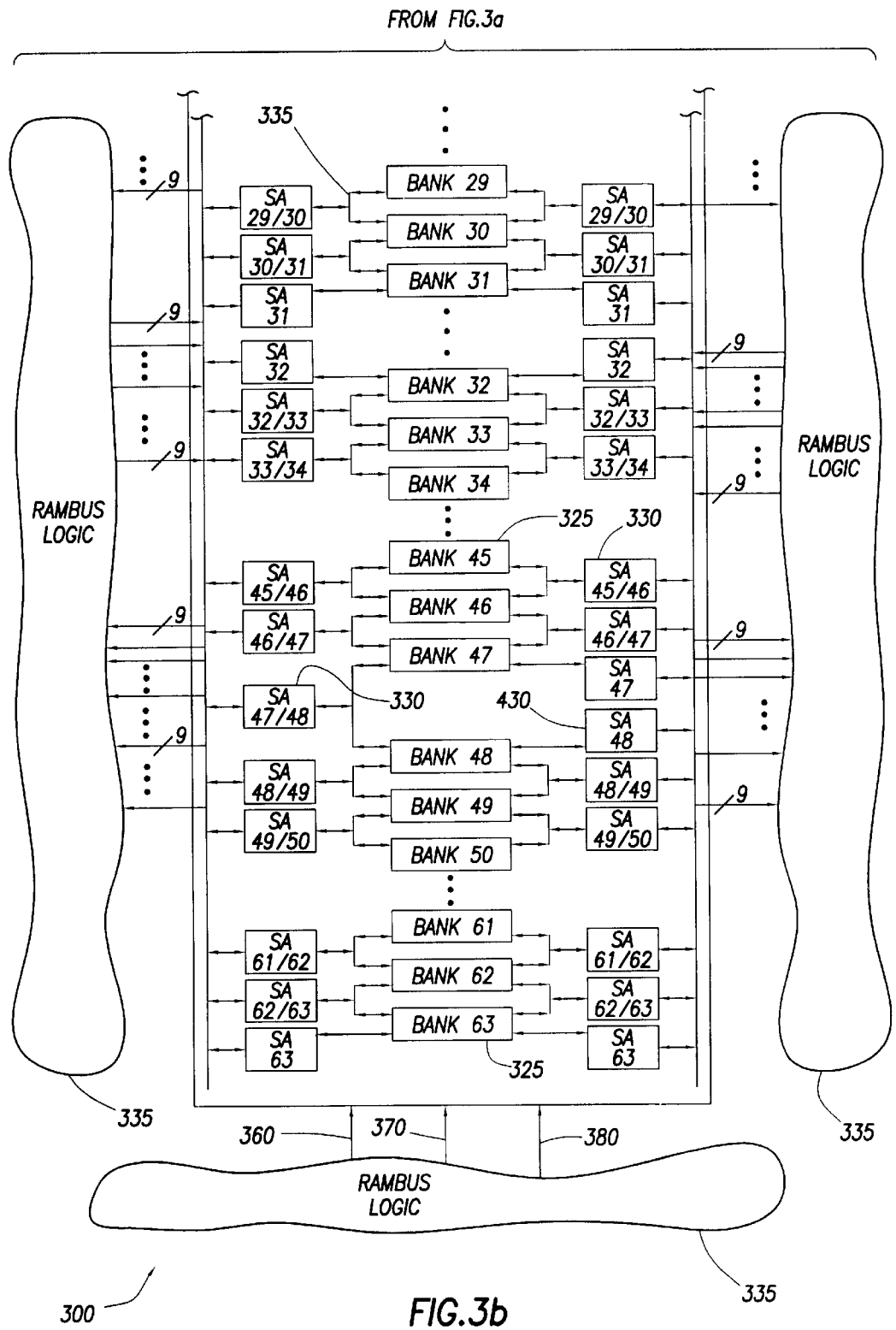

Referring now to FIG. 3, a RAMbus™ DRAM ("RDRAM") device 300 includes a DRAM core device 320 containing memory banks 325 and sense amplifiers 330 and RAMbus™ interface logic 335 that permits an external control device to preferably access the DRAM core 320 at up to 1.6 gigabytes/second. A number of memory banks 325, preferably sixty-four are shown in FIG. 3 although a DRAM core device 320 with 16, 32, 128, or a multiplier of 64 may be used in the preferred embodiment. Each DRAM core device 320 preferably contains 64 sense amplifiers 330. Each sense amplifier 330 shared 335 between two adjacent banks 325 of the DRAM core device 320 (except for sense amplifiers 0, 31, 32, and 63 that are not shared). The sense amplifiers 330 are connected through data paths DQA and DQB 350 that read and write data to RAMbus™ interface logic 335 that is then output to the memory controller 190. Control lines Precharge 360, RowA 370, and ColCRd/ColCWr 380, respectively, causes a memory bank to close a page, activate a page, or read/write a page to the memory bank through DQA and DQB 350.

In the preferred embodiment, the 64 Mbyte DRAM core device 320 of the RDRAM 300 is divided into 64 one-Mbyte banks 325, each organized as 512 rows, with each row containing 128 columns and each column containing sixteen bytes. Thus, each row contains 2 Kilobytes of data (128*16=2 Kilobytes). A column is the smallest unit of data that can be addressed in a memory bank. The RDRAM 300 preferably contains 64 sense amplifier buffers 330. Each sense amplifier buffer 330 is capable of storing 1024 bytes (512 for DQA and 512 for DQB) and in the preferred embodiment can hold one-half of one row of a RDRAM memory bank 325. The number of bytes that can be stored in two sense amplifiers 330 is called the page size of the RDRAM device 300 because each memory bank 325 has access to two sense amplifiers 330. Thus, the page size for the preferred embodiment is 2048 bytes (2 Kilobytes). In other embodiments of the invention, a page can be 1 Kilobyte or 4 Kilobytes based on the storage capacity of the sense amplifier. A sense amplifier may hold any of the 512 half-rows of an associated memory bank. However, as mentioned above, each sense amplifier is shared 335 between two adjacent banks of the RDRAM. This introduces the restriction that adjacent banks 325 in the preferred embodiment may not be simultaneously accessed.

Control line Precharge 360 coupled to the DRAM core device 320 transmits a precharge command that, along with the (RDRAM device, memory bank) address, causes the selected memory bank 325 to release its two associated sense amplifiers 330. This permits a different row in that memory bank to be activated, or permits adjacent memory banks to be activated. The RowA 370 control line coupled to the DRAM core device 320 transmits an Activate command that, along with the (RDRAM device, memory bank) and row address, causes the selected row of the selected bank to be loaded into its associated sense amplifiers 330 (two 512 byte sense amplifiers for DQA and two 512 byte sense amplifiers for DQB). The ColCRd 380 command is issued to a (RDRAM device, memory bank, column) to transfer a column of data (16 bytes) from one of the two sense amplifiers 330 shared by the memory bank 325 through the DQA/DQB 350 data paths to the RAMbus™ interface logic 335. The data is then output to the Zbox memory controller 190. A ColCWr 380 command transfers a column of data from the Zbox memory controller 190 through the RAMbus™ interface logic 335 and DQA/DQB data paths 350 to one of the two sense amplifiers 330 for the (RDRAM device, memory bank, column).

Figure 4:
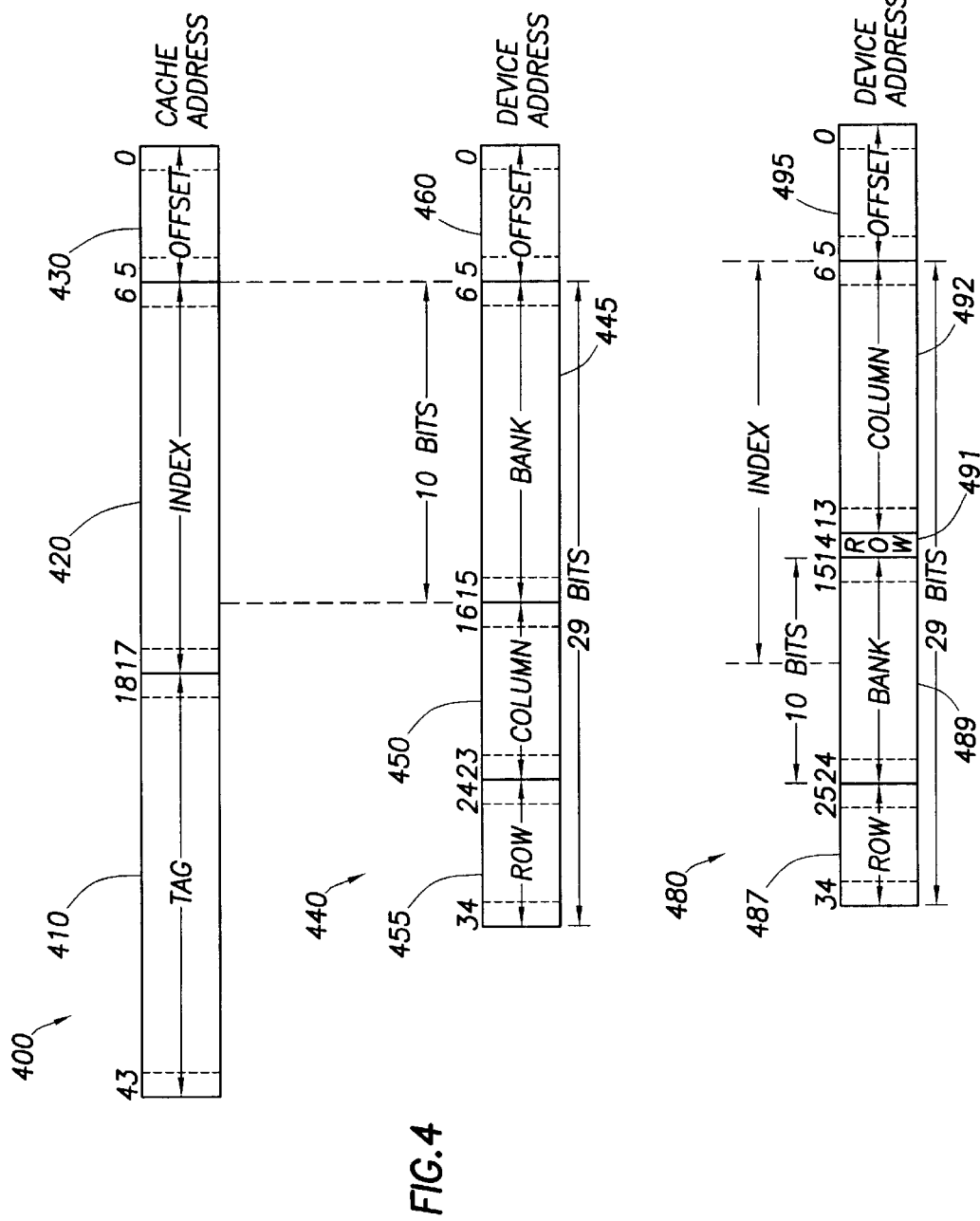
FIG. 4 shows mappings of a processors address to a cache address and device addresses.

Turning now to FIG. 4, the processor in the computer system organizes main memory by allocating a processor address to each byte of main memory storage. For each read or write memory access to a byte of data, the cache memory interprets the 44 bit processor address of the byte as a cache address 400 to determine whether the memory block containing the byte is present. The cache address includes a tag subfield 410, an index subfield 420 and an offset subfield 430. As explained above, the index subfield 420 in a set associative cache memory identifies the particular set in the cache memory to which a block of data from main memory can be mapped. Each set in the cache memory contains a number of block frames to which a data block from main memory can be placed. A block in a block frame within a set is identified by its tag subfield from the cache address. The offset subfield 410 in the cache address determines the actual byte within the block of data in the cache memory.

Zbox memory controller 190 preferably interprets the processor address as a device address 440 that identifies a particular preferred RDRAM memory device, memory bank, row and column. In one embodiment, a ten-bit wide bank subfield 445 includes a five-bit wide bank number and a five-bit wide device number. Bits [15:6] corresponding to the bank subfield 445 in the device address 440 all correspond to bits [15:6] of the index subfield 420 of the cache address 400. Row subfield 455 identifies a particular row or page within a memory bank for the device address 440. Column subfield 450 preferably identifies a 16-byte column of data in the row 455 of the memory bank 445 for the device address 440. Offset subfield 460 identifies a particular byte within a column 450 of data.

FIG. 4 shows the device address mapping of the preferred embodiment using a ten bit wide bank subfield 489 that includes a five bit wide bank number and a five bit wide device number. Bits [24:15] corresponding to the bank subfield 445 in the device address 440 do not completely fall within bits [17:6] corresponding to index subfield 420 of the cache address 400. Thus, bank subfield 489 bits [24:18] are above the upper bit of index subfield 420 in the cache address 400. The row subfield 487 and row bit 491 of the device address 480 identifies the row or page within a memory bank. In the preferred embodiment, the row identifier is divided into subfields 487 and 491 so that the bank subfield 489 can shift left and not overlap completely with the index subfield 420 of the cache address 400. Column subfield 492 preferably identifies a 16-byte column of data in the row of the memory bank 445 for the device address 440. Offset subfield 495 identifies a particular byte within a column 492 of data.

Device address mapping 440, because bank subfield 445 bits each correspond to bits in the index subfield, results in memory bank conflicts whenever replacement of a block in cache memory occurs. A cache miss occurs when a needed block of data is not present in the cache memory. The cache requests the needed data block from main memory by performing a read to the memory block. If the block of data to be removed from cache memory, the victim block, has been modified, then this modified block of data must be written back to main memory. The requested data block from main memory is placed into a particular set of the cache memory based on its index subfield 420. Since the victim block was also placed into a set based on its index subfield 420 and a set in the memory cache is identified by one index subfield 420, both the requested data block and victim block must have the same index subfield 420. In device address 440 bank subfield 445 bits each correspond to bits in index subfield 420. Thus, the requested data block and victim block would both have identical bank subfields 445 and would both access the same RDRAM device and memory bank. The read resulting from the request for the data block would cause the opening of a row/page from the memory bank. Assuming the victim block is in a different row/page then the read request data block, the cache would then write the victim block to the different row/page of the same memory bank closing the previously opened row/page for the requested data block and opening the row/page for the victim block. Because of the sequential nature read and write and the opening and closing of multiple row/pages, memory system performance would be significantly reduced.

As mentioned above, the phenomenon of locality of reference makes it highly likely that contiguous blocks of data stored in a row/page will be accessed. Thus, the likelihood of subsequent cache misses and replacement of data blocks is highly probable. If the cache memory requires a different block of data and consequently must replace another victim block and these new memory requests require the same memory bank and row/page as the data blocks of the prior replacement request, then the request would result in the closing of the previous row/page in the memory bank for the victim block and opening of the row/page for the read resulting from the new request. Thus, if the row/page prior read request for the data block had not been closed, then the subsequent access to the same row/page would have resulted in a row/page hit. Similarly if the row/page for the prior victim block had not been closed, then the subsequent access to the same row/page would have resulted in a row/page hit.

Device address mapping 480 shows one preferred embodiment that overcomes the disadvantages of device address mapping 440 by changing the location of the bank 489, column 492 and row 487 subfields relative to the cache address 400. Bank subfield 489 bits [24:18] are above the upper bit of index subfield 420 in the cache address 400. This results in selection of a different memory bank for the read request data block and victim data block.

Preferably, based on placement of the subfields across the 29 bits, a total of 122 different device address mappings are possible using software programming. Bank subfield 489 in device address 480 may be programmably shifted left or right by shifting the corresponding row subfield 487 and column subfield 492. Shifting of the bank subfield 489 must follow a few general guidelines. Bank subfield placement must be such that the upper bits of the bank subfield are above index subfield 420 boundary bit [17]. Right shifting the bank subfield as much as possible while maintaining a few bits above the index subfield boundary bit will allow multiple pages to remain open. This will permit sequential accesses to reference many different memory banks and take advantage of the inherent parallelism exposed by the memory banks for the cache replacement scenario described above.

Maintaining the row subfield left of the bank subfield and the column subfield right of the bank subfield would also take advantage of the locality of reference sequential access phenomenon. A row/page miss would result in the missed row/page being opened and subsequent sequential access to the same row/page resulting in page hits. This is because sequential accesses will more than likely be to the same row/page but different columns within the row/page with the row subfield 487 and column subfield 492 locations shown. Thus, the placement of subfields shown in device address mapping 480 tries to advantageously balances both locality of reference and parallelism of multiple open rows/pages.

Figure 5:
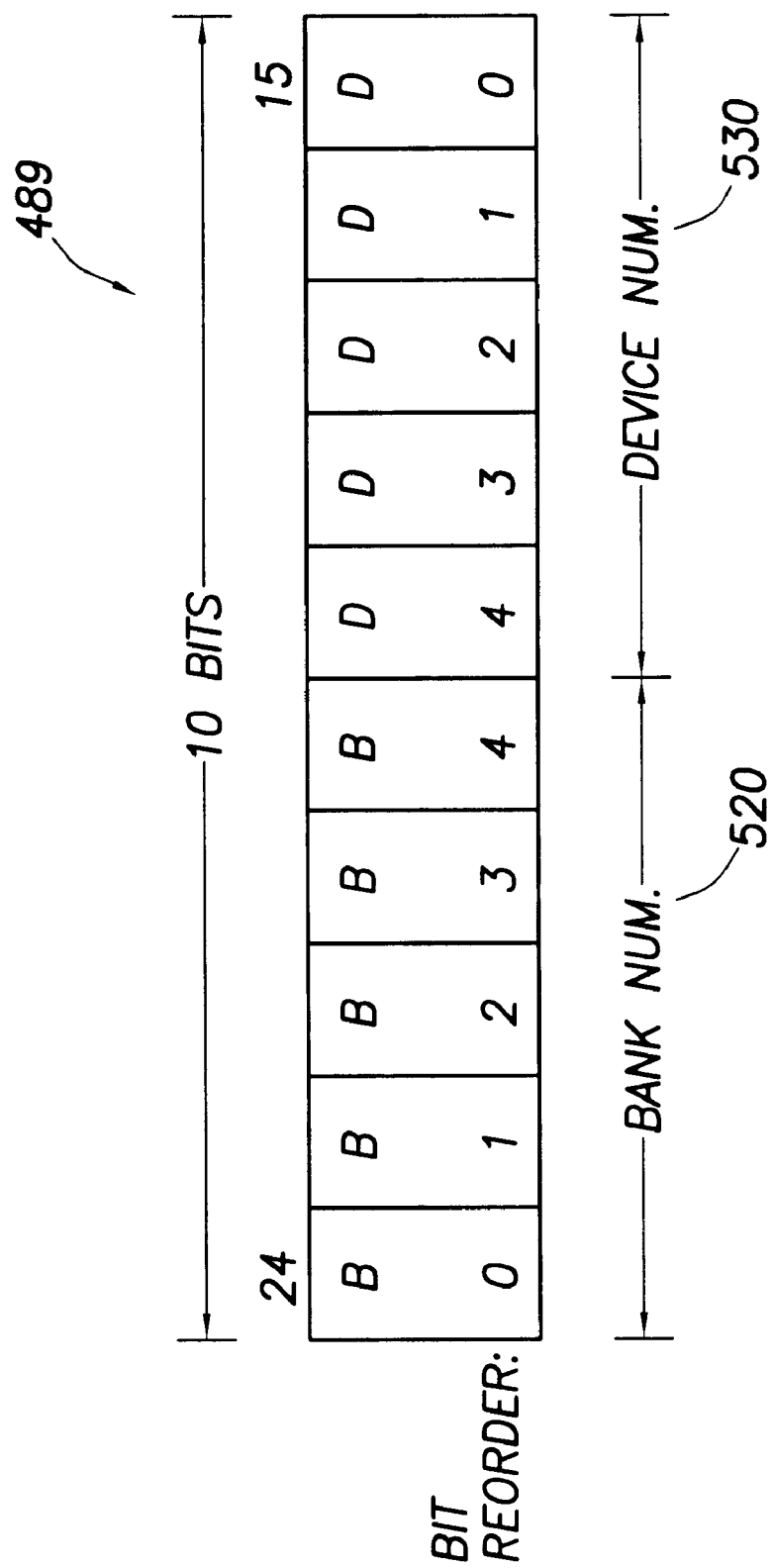
FIG. 5 shows bit reversal of the bank number that minimizes adjacent bank conflicts for contiguous row/page accesses.

Referring now to FIG. 5, locality of reference for sequential accesses may lead to conflicts between adjacent banks that implement shared sense amplifier buffer DRAM core devices. Locality of reference improves performance for memory accesses within the same row/page because the row/page is already open. If sequential accesses result in open row/pages from adjacent banks, memory performance will suffer significantly because the shared sense amplifier buffer architecture does not permit two adjacent banks to concurrently have open rows/pages. In the preferred embodiment shown in FIG. 5, reordering of the ten bit bank subfield 489 in device address 480 advantageously solves the problem of memory accesses requiring open row/pages from adjacent banks. The bank subfield 489 includes bank number subfield 520 and device number subfield 530. Bank number subfield 520 preferably specifies a memory bank out of the 32 possible memory banks in the RDRAM device. Device number subfield 530 preferably specifies a RDRAM device out of 32 possible RDRAM devices in the computer system. Thus, 1024 memory banks can be addressed by the 10-bit bank subfield 489.

Bit ordering of bank subfield 489 is from right to left, with the least significant bit [15] on the right and most significant bit [24] on the left. Minimizing adjacent bank conflicts requires that the bank number subfield 520 bit order be reversed as shown in FIG. 5 with most significant bit [24] becoming the least significant bit [0] of bank number subfield 520 after the bit reordering. Thus, incrementing the bank number subfield by one from bank number subfield= 10000 (16) to bank number subfield=10001 (17) after bit reversal would result in accesses to bank number=00001 (1) and bank number=10001 (17). Thus, bit order reversal of the bank number subfield 520 significantly minimizes accesses to rows/pages in adjacent banks using a straightforward solution that can be implemented quickly and simply in hardware.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A computer system, comprising:

a processor including a memory mapper that is software programmable, wherein said memory mapper maps a processor address into a device address;

a cache controller in said processor, said cache controller mapping the processor address into a cache address;

a system memory coupled to said processor, said system memory containing a plurality of memory devices, each of said memory devices containing a plurality of memory banks; and wherein said memory mapper reduces memory access conflicts between said plurality of memory banks;

wherein said cache address includes an index subfield containing a plurality of bit positions and said device address includes a bank subfield containing a plurality of bit positions, and said bank subfield includes a bank number subfield, said bank number subfield containing a plurality of bit positions; and wherein said memory mapper reverses the order of the bank number subfield bit positions to prevent memory accesses simultaneously requiring open pages from adjacent memory banks.

2. The computer system of claim 1 wherein at least a number of said plurality of bank subfield bit positions do not have overlapping index subfield bit positions such that replacement of a data block in a cache memory in the computer system will result in fewer memory bank conflicts.

3. A computer system, comprising:

a processor including a memory mapper that is software programmable, wherein said memory mapper maps a first address into a second address;

a cache controller in said processor, said cache controller mapping the first address into a third address;

a system memory coupled to said processor, said system memory containing a plurality of memory devices, each of said memory devices containing a plurality of memory banks;

wherein said memory mapper increases memory system performance by minimizing memory access conflicts between said plurality of memory banks; and a disk drive coupled to said processor;

wherein said third address includes an index subfield containing a plurality of bit positions and said second address includes a bank subfield containing a plurality of bit positions, and said bank subfield includes a bank number subfield comprising a plurality of bit positions; and wherein said memory mapper reverses the order of the bank number subfield bit positions to prevent memory accesses simultaneously requiring open pages from adjacent memory banks.

4. The computer system of claim 3 wherein at least a number of said plurality of bank subfield bit positions do not have overlapping index subfield bit positions such that replacement of a data block in a cache memory in the computer system will result in fewer memory bank conflicts.

5. A processor adapted to access memory, comprising:

a cache controller which maps a processor address to a cache address;

a memory mapper that maps a processor address to a device address;

wherein said cache address includes an index subfield containing a plurality of bits and said device address includes a bank subfield containing a plurality of bits that encodes a multibit bank number subfield; and wherein said memory mapper reverses the order of the bank number subfield bits to prevent memory accesses simultaneously requiring open pages from adjacent memory banks.

6. The processor of claim 5 wherein at least a number of said plurality of bank subfield bits do not have overlapping index subfield bits such that replacement of a data block in a cache memory will result in fewer memory bank conflicts.

7. A method of accessing memory, comprising:

mapping a processor address to a cache address which includes an index subfield;

mapping a processor address to a device address which includes a bank subfield containing a plurality of bits that encodes a multibit bank number subfield;

reversing the order of the bank number subfield bits to prevent memory accesses simultaneously requiring open pages from adjacent memory banks.

* * * * *